3,041,380
PRODUCTION OF UNSATURATED KETONES

Richard Norman Lacey, Hull, England, assignor to The Distillers Company Limited, Edinburgh, Scotland, a British company
No Drawing. Filed Dec. 17, 1959, Ser. No. 860,081
Claims priority, application Great Britain Jan. 14, 1959
4 Claims. (Cl. 260—595)

The present invention relates to the production of organic compounds and in particular to the production of unsaturated ketones.

According to the present invention, the process of producing an unsaturated ketone representable by the formula

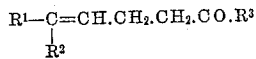

comprises contacting an allyl acetoacetate representable by the formula

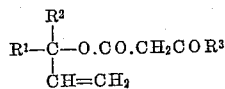

with an aluminium compound representable by the formula

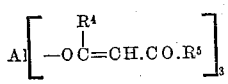

wherein $R^1$ and $R^2$ are alkyl groups or hydrogen atoms, $R^3$ is a lower alkyl group, and at least one of the groups $R^4$ and $R^5$ is a lower alkyl group, the other group being a lower alkyl or a lower alkoxy group.

The allyl acetoacetate may be contacted with the aluminium compound with advantage at an elevated temperature, preferably at a temperature in the range from 100° to 300° C. The temperature used in any particular embodiment of the invention depends on the nature of the allyl acetoacetate heated; if, for instance, the allyl acetoacetate is methyl-butenyl acetoacetate, it may be heated at a temperature from 110° to 170° C., preferably from 140° to 170° C. The allyl acetoacetate is conveniently heated with the aluminium compound in an apparatus which enables a steady stream of carbon dioxide to be evolved and removed.

The aluminium compound used in the process of the invention may be, for example, aluminium tri-(acetylacetonate) or an aluminium tri-(alkyl acetoacetate) such as aluminium tri-(methyl acetoacetate) or aluminium tri-(ethyl acetoacetate). The tri-(acetylacetonate) may be prepared adding a solution of aqueous acetylacetone in ammonia to an aqueous solution of aluminium sulphate, neutralising the resulting mixture and removing the aluminium tri-(acetylacetonate) precipitated. The tri-(ethyl acetoacetate) and the tri-(methyl acetoacetate) may be prepared by reacting the ethyl acetoacetate or methyl acetoacetate with an aluminium trialkoxide, removing the alkanol produced and recovering the aluminium tri-(ethyl acetoacetate) or the aluminium tri-(methyl acetoacetate).

The following examples further illustrate the invention.

Examples 1 to 6

A series of samples of methylbutenyl acetoacetate were heated with an aluminium compound catalyst according to the present invention in a reactor fitted with a stirrer and a gas outlet, at various temperatures from 140° to 170° C., so that a steady stream of carbon dioxide was evolved from pyrolysis of the methylbutenyl acetoacetate, leaving methylheptenone in the reactor. The nature and proportion of the aluminium compound, the temperature to which the mixture of methylbutenyl acetoacetate and the aluminium compound was heated and the yield of methylheptenone produced based on the methylbutenyl acetoacetate, are shown in the following table. The catalyst concentration is shown as millimoles of aluminium compound per mole of methylbutenyl acetoacetate. In the table is also included, as a comparison, the yield of methylheptenone obtained under the same conditions except that no aluminium compound catalyst was present.

| Example | Catalyst | Catalyst concentration | Temp., °C. | Yield of methylheptenone, percent |
|---|---|---|---|---|
| | None | 0 | 140–170 | 63.5 |
| 1 | Aluminium tri-(ethyl acetoacetate) | 24 | 140–170 | 84 |
| 2 | ......do...... | 16 | 140–170 | 82.8 |
| 3 | Aluminium tri-(acetylacetonate) | 24 | 140–170 | 83.5 |
| 4 | ......do...... | 16 | 163–165 | 83 |
| 5 | ......do...... | 16 | 140 | 82.7 |
| 6 | Aluminium tri-(methyl acetoacetate) | 16 | 140–170 | 83 |

Example 7

253 parts by weight of methylpentenyl acetoacetate were heated with 7.15 parts by weight of aluminium tri-(acetylacetonate) as catalyst in a reactor maintained at 140° to 170° C., so that a steady stream of carbon dioxide was evolved from pyrolysis of the methylpentenyl acetoacetate, leaving methyloctenone in the reactor. The catalyst concentration was 16 millimoles per mole of methylpentenyl acetoacetate.

The yield of methyloctenone obtained was 79.4%. The yield of methyloctenone obtained under the same conditions but in the absence of the aluminium tri-(acetylacetonate) was 65%.

Example 8

500 parts by weight of linalyl acetoacetate were heated with 10.9 parts by weight of aluminium tri-(acetylacetonate) as catalyst in a reactor maintained up to 210° C. The linalyl acetoacetate was pyrolysed to geranyl acetone.

The catalyst concentration was 16 millimoles per mole of linalyl acetoacetate.

The yield of geranyl acetone was 73%.

I claim:

1. A process of producing an unsaturated ketone representable by the formula

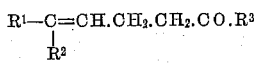

which comprises contacting at a temperature in the range of 100° to 300° C. an allyl acetoacetate representable by the formula

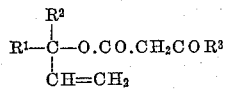

with an aluminium compound representable by the formula

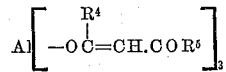

wherein $R^1$ and $R^2$ are selected from the group consisting of alkyl groups and hydrogen atoms, $R^3$ is a lower alkyl group, and $R^4$ and $R^5$ are selected from the group consisting of lower alkyl groups and lower alkoxy groups at least one being a lower alkyl group.

2. A process claimed in claim 1 wherein the aluminium compound is aluminium tri-(acetylacetonate).

3. A process claimed in claim 1 wherein the aluminium compound is aluminium tri-(methyl acetoacetate).

4. A process claimed in claim 1 wherein the aluminium compound is aluminium tri-(ethyl acetoacetate).

References Cited in the file of this patent
UNITED STATES PATENTS

| | | |
|---|---|---|
| 2,795,617 | Kimel et al. | June 11, 1957 |
| 2,839,579 | Kimel et al. | June 17, 1958 |